Aug. 28, 1962 EIICHI GOTO 3,051,843

COUPLING CIRCUITS FOR DIGITAL COMPUTING DEVICES

Filed Aug. 15, 1956 3 Sheets-Sheet 1

COUPLING CIRCUITS FOR DIGITAL COMPUTING DEVICES

Filed Aug. 15, 1956 3 Sheets-Sheet 3

United States Patent Office 3,051,843 Patented Aug. 28, 1962

3,051,843
COUPLING CIRCUITS FOR DIGITAL COMPUTING DEVICES

Eiichi Goto, Meguro-ku, Tokyo-to, Japan, assignor to Kokusai Denshin Denwa Kabushiki Kaisha, Tokyo-to, Japan Filed Aug. 15, 1956, Ser. No. 604,241
Claims priority, application Japan Aug. 31, 1955
5 Claims. (Cl. 307—88)

This invention relates to an improvement in an electric digital computing device comprising parametrically excited resonators and more particularly to an improvement in a device for coupling said resonators.

Electric computers, electric communication apparatus and electric controllers in which parametrically excited resonators are utilized as their circuit elements have hitherto been proposed, which will be described in detail hereinafter.

An oscillation can be produced in a resonant circuit by varying the resonance frequency of said resonant circuit abruptly with an exciting wave having a frequency of about twice the resonance frequency of the resonant circuit. This phenomenon is called "parametric excitation of oscillation," and the device capable of carrying out the phenomenon is called a "parametrically excited resonator." This phenomenon has been described in the following literature (cf. N. W. Mclachlan: Ordinary Nonlinear Differential Equations, Oxford 1950), and Eiichi Goto U.S. Patent 2,948,818. Hereinafter, the parametrically excited resonators, according to the invention, will be called "parametrons."

The oscillation phase of a parametron can be either one of two phases which are different by 180°, for example, 0 radian and $\pi$ radian. Accordingly, when a weak alternating current having a frequency equal to the oscillation frequency of the parametron or resonator is applied to the resonant circuit of the parametron or resonator at the same time as or slightly prior to the application of exciting alternating current, the oscillation phase of the parametron is controlled to either one of 0 radian and $\pi$ radian in accordance with the phase of said weak alternating current.

The above characteristic of parametrons is utilized in the present invention. In digital computing apparatus making use of parametrons as circuit elements, there is a possibility that undesirable operations will be caused by inverse coupling among different parametrons.

A principal object of this invention is to provide a device precluding inverse coupling among parametrons so that their characteristics can be maintained and the reliability of computer circuits may be improved.

According to this invention, parametrons in the circuit are connected in cascade, as in the case of connection by passive linear elements, by using the electric circuit or circuits of which transmission characteristics vary synchronously with interruption of oscillation of the parametrons.

The construction and operations, together with further objects and advantages of this invention may best be understood by reference to the following description, taken in conjunction with the accompanying drawings, in which.

Figures 1A, 1B:
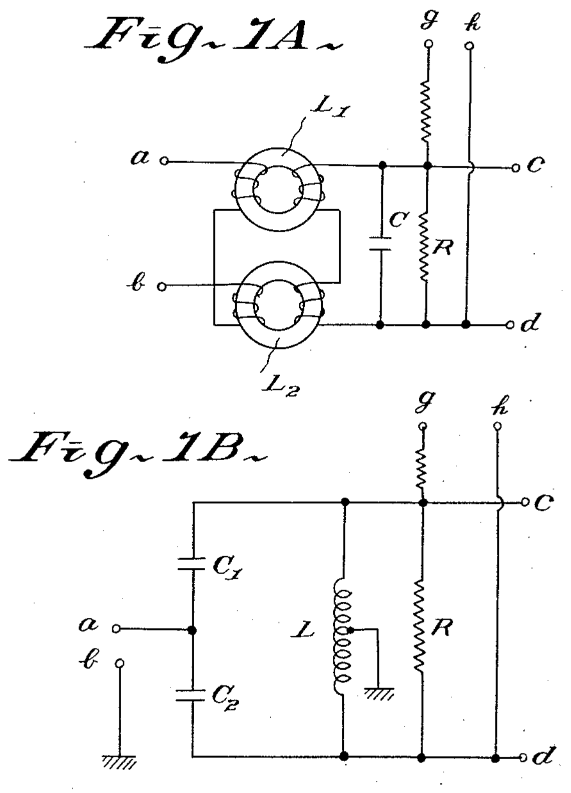
FIG. 1A is a schematic diagram illustrating an embodiment of a parametron.
FIG. 1B is a schematic diagram illustrating another embodiment of a parametron.
Figure 1C:
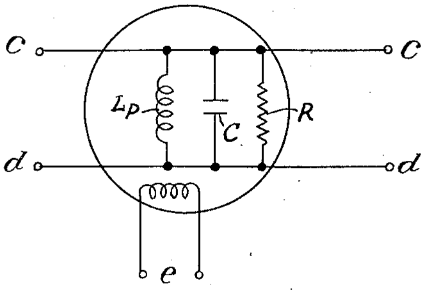
FIG. 1C is a symbolized diagram of the parametron illustrated in FIG. 1A.
Figure 1D:
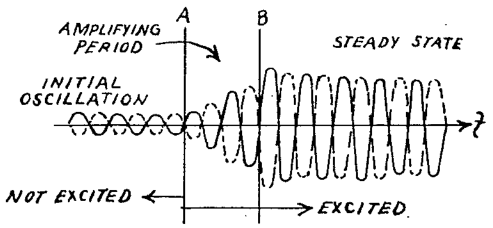
Figure 2A:
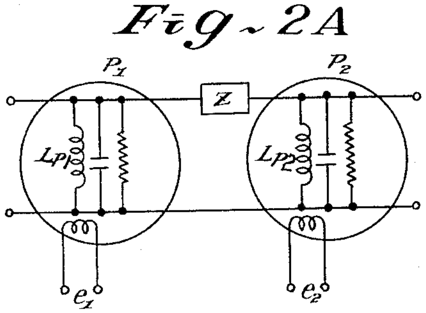
Figure 3A:
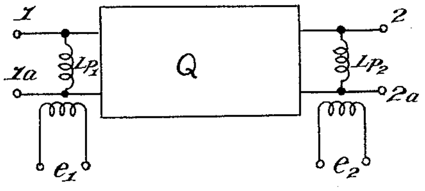
Figure 2B:
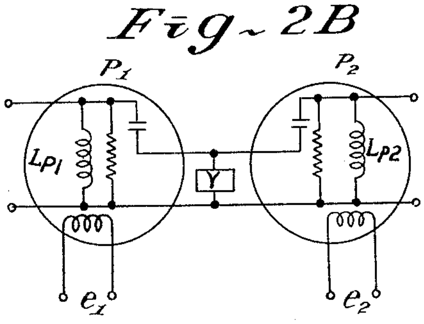
Figure 3B:
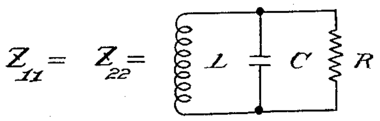
Figure 4:
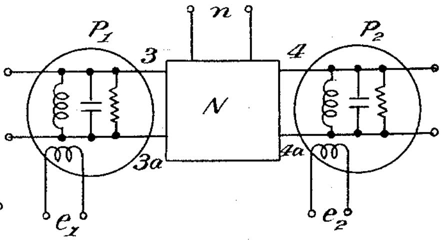
Figure 2C:
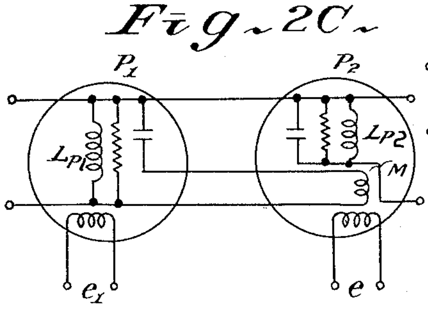
Figure 5:
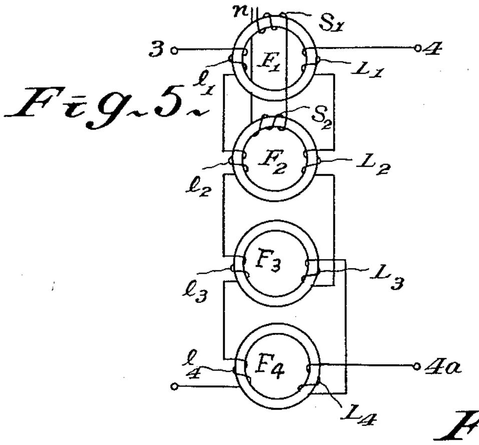
Figure 6:
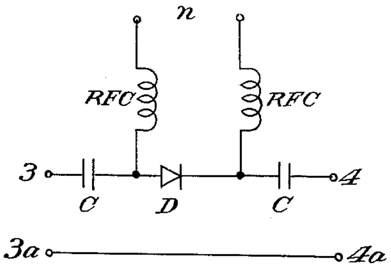
Figure 7A:
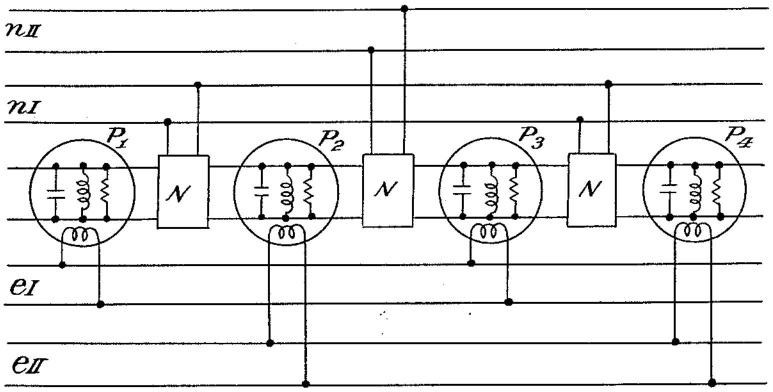
Figure 7B:
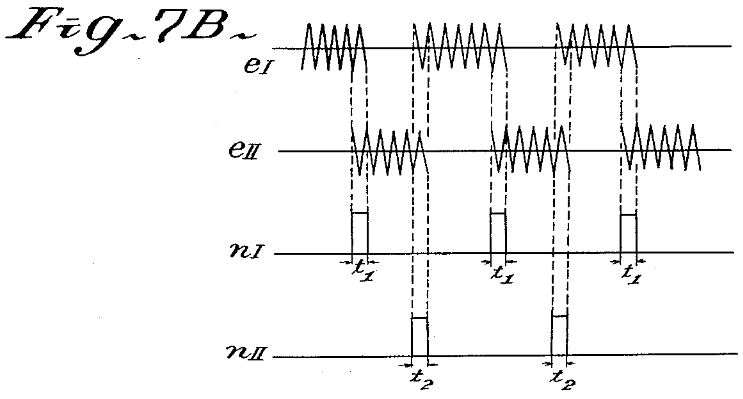

FIG. 1D is a wave form diagram showing the principle of operation of the resonator according to the present invention, FIG. 2A is a circuit diagram illustrating a circuit for coupling two parametrons, FIG. 2B is a circuit diagram illustrating another circuit for coupling two parametrons, FIG. 2C is a circuit diagram illustrating another circuit for coupling two parametrons, FIG. 3A is an equivalent circuit diagram for describing a linear coupling characteristic of the parametrons, FIG. 3B is an equivalent circuit of the circuit of FIG. 3A, FIG. 4 is a schematic diagram of an embodiment of the invention, FIG. 5 is a schematic diagram illustrating a coupling circuit according to the invention, FIG. 6 is a schematic diagram illustrating another coupling circuit according to the invention, FIG. 7A is a schematic diagram of an application of this invention, FIG. 7B is a diagram of wave forms illustrating the operations of the circuit in FIG. 7A.

A parametron, according to FIG. 1, consists of a ferro-magnetic core $L_1$ provided with a primary coil and a secondary coil and another ferro-magnetic core $L_2$ provided with a primary coil and a secondary coil. Each pair of primary and secondary coils are connected in series, and either pair of the coils, for example, the primary coils is wound in opposition to the other pair of coils so that a secondary output does not have a frequency equal to that of the exciting current supplied from the exciting terminals *a* and *b*. A condenser C is connected in parallel with the output terminals *c* and *d* to form a resonant circuit. A resistance R is connected in parallel with the condenser C as a damping resistance.

When an exciting current having a frequency twice that of the resonance frequency of the resonant circuit, the secondary circuit of the parametron, is applied to the exciting terminals *a* and *b*, together with a direct current superposed thereon, an oscillation wave having one half the frequency of the exciting frequency is generated in the resonant circuit. This generated wave can be taken out from the output terminals *c* and *d*. The phase of the output wave is either one of two phases which differ by 180°. The phase of the output oscillation is determined by the phase of a weak control wave, having a frequency equal to the oscillation frequency of the parametron, applied to the terminals *g* and *h*.

In the embodiment of FIG. 1A, since the primary coils, wound on two cores and inserted between the exciting terminals *a* and *b* and the output terminals *c* and *d*, are wound to cancel their induced voltages in each other, a voltage will not appear between the output terminals *c* and *d* even when an electric current is applied to the exciting terminals *a* and *b*. However, since the permeability of the ferro-magnetic core is varied and determined by said current, the resonance frequency of the resonant circuit connected to the terminals *c* and *d* is varied and determined. In the embodiment of FIG. 1B similarly a voltage is not induced between the output terminals *c* and *d* even when an exciting current is applied to the input terminals *a* and *b*, because the condensers $C_1$ and $C_2$ have a balanced configuration relative to the inductor L. However, the resonance frequency of the resonant circuit connected to the output terminals *c* and *d* varies due to the nonlinearity of the condensers $C_1$ and $C_2$.

Now, let it be assumed that the resonant circuit connected to the output terminals *c* and *d* is in a resonant state with a frequency $f$ and a weak resonant current $I_f$ having a frequence $f$ exists in said circuit. In this state, when an exciting current having a frequency $2f$ is applied to the exciting terminals *a* and *b*, a voltage having the beat frequency of the two freqeuncies $2f$ and $f$ is induced in said resonant circuit due to cross modulation. The beat frequency is equal to $(2f-f)$ and accordingly, equal to the frequency $f$ of said weak resonant current.

Accordingly, if the phase of said beat voltage corresponds to the positive feed back direction capable of strengthening the weak resonant current, then the resonant current increases suddenly, thereby an oscillation having a frequency $f$ (½ subharmonic of the exciting current having frequency $2f$) is generated in the resonant circuit. On the other hand, the positive feed back is most effective in two phases which are different by 180° from each other. Accordingly, the oscillation having either one of the above mentioned two phases is generated in the resonant circuit.

FIG. 1D shows the above mentioned fact. Two voltages at the output terminals $c$ and $d$ of FIGS. 1A and 1B are shown in FIG. 1D, in which the solid line represents the oscillation having the frequency $f$ and a phase of 0° and the dotted line represents the oscillation having the phase of 180°. When an exciting current is applied to the exciting terminals $a$ and $b$ of FIG. 1A and FIG. 1B at the time point Ⓐ, the initial oscillation of small amplitude increases suddenly during the period between the time points Ⓐ and Ⓑ and then assumes a steady state. The phase of the steady state oscillation, as will be understood from FIG. 1D, can be controlled by the phase of the weak initial oscillation and this control can be achieved each time the parametron oscillation is restarted after interruption thereof. The phase control signal of the parametron is applied to the resonant circuit at the terminals $g$ and $h$ of FIG. 1A or FIG. 1B. This signal causes the initial oscillation so as to control the oscillation of the steady state. When the oscillation of the parametron assumes a steady state the phase and amplitude of the oscillation of the steady state are not varied even when the phase control signal applied to the terminals $g$ and $h$ is cut-off or the phase of said phase control signal is inverted. Accordingly, the next control operation is carried out after interruption of the oscillation.

The parametron illustrated in FIG. 1B, in which the same parts as the parametron in FIG. 1A are indicated by the same reference numerals, relates to an embodiment, in which the resonant circuit consists of nonlinear capacitors $C_1$ and $C_2$ and an inductance coil L. In this parametron an output oscillation wave having one half the frequency of the exciting frequency of the parametron can be taken from the ouput terminals $c$ and $d$ by supplying the exciting terminals $a$ and $b$ with an exciting current having about twice the frequency of said resonance frequency together with a direct current superposed thereon.

The oscillation principles of the parametron illustrated in FIG. 1B are similar to those of the parametron illustrated in FIG. 1A, so that the principles of the parametron will be described only in connection with the parametron in FIG. 1A.

Generally, the parametron has a property such that the phase of the output oscillation thereof can be selected as either one of two phases which differ by 180°, by supplying the parametron with a weak phase control current. Consequently, it is possible to manufacture various electric apparatus such as electric computers and electric communication apparatus by suitable combinations and connections of the parametrons. For example, in performing mathematical operations using a binary system of notation one phase of the output can correspond to "0" and the opposite phase can correspond to "1."

In a symbolized connection diagram, FIG. 1C, the inductive element, capacitor and resistor of the resonance circuit, exciting terminals and output terminals are, respectively, represented by $L_p$, C, R, $e$ and $c$, $d$. In the following description, the parametrons are indicated by such symbolized diagram as shown in FIG. 1C in order to simplify the disclosure.

Two parametrons $P_1$ and $P_2$ can be coupled, as shown in FIGS. 2A, 2B and 2C through a passive linear circuit composed of inductors, condensers and resistors. FIG. 2A corresponds to an impedance coupling system, in which a coupling impedance Z is connected in series with the resonant circuits of the parametrons. FIG. 2B corresponds to an admittance coupling system, in which an admittance Y is connected in parallel with the resonant circuit of the parametrons and FIG. 2C corresponds to a coupling system of the mutual inductance type.

The most generally used coupling system for coupling two parametrons of the ferro-magnetic type is a passive linear network exciting terminals and exciting inductive elements of the parametrons, $P_1$ and $P_2$, which are, respectively, represented by Q, $e_1$, $e_2$, and $L_{p1}$ and $L_{p2}$ in FIGS. 2A, 2B, 2C and 3A. When it is assumed that each inductance of the inductive elements, $L_{p1}$ and $L_{p2}$, is L in case that both of the exciting currents applied to $e_1$ and $e_2$ are zero, the characteristic of a four terminal passive linear network Q having four terminals 1, 1$a$, 2 and 2$a$, including the inductive elements, is represented by the following impedance matrix.

$$\left\{\begin{matrix} Z_{11}Z_{12} \\ Z_{21}Z_{22} \end{matrix}\right\} \quad (1)$$

Since the impedance matrix of passive linear type four terminals must be symmetrical, the following equation is established.

$$Z_{12}=Z_{21} \quad (2)$$

Moreover, $Z_{11}$ and $Z_{22}$ should be equivalent to the circuit shown in FIG. 3B at a frequency near the oscillation frequency $f$ of the parametrons in order to make the parametrons, $P_1$ and $P_2$, oscillate.

In FIG. 3B, equivalent parallel capacity and equivalent parallel resistance are represented, respectively, by C and R.

Now, considering the above mentioned relations, I define K and $\theta$ by the following equation:

$$\left(\frac{Z_{12}}{Z_{11}}\right)f=\left(\frac{Z_{21}}{Z_{22}}\right)f=Ke^{j\theta}K\geq 0 \quad (3)$$

in which

K is oscillation coupling coefficient.
$\theta$ is coupling phase angle.
$f$ is oscillation frequency of the parametron (½ of the exciting frequency of the parametrons).

If it is assumed that only the parametron $P_1$ is excited so as to produce an oscillation voltage $E_1$ in the circuit of FIG. 3A, the voltage induced in the parametron $P_2$ takes the value represented by the following Equation 4, due to the above characteristic of the passive linear four terminal circuit.

$$E_{12}=Ke^{j\theta}E_1 \quad (4)$$

Inversely, when only the parametron $P_2$ is made to oscillate with a voltage $E_2$, a voltage, as represented by the following Equation 5, is induced in the parametron $P_1$.

$$E_{21}=Ke^{j\theta}E_2 \quad (5)$$

Since the absolute value of $e^{j\theta}$ is 1, the above mentioned characteristic shows the fact that, when the parametrons are coupled by a passive linear network, the transmission characteristic of the voltage cannot have a directional character. Such a character is unavoidable so far as a passive linear network is used as the coupling circuit. This disadvantage always occurs even when the exciting elements of the parametron are substituted with nonlinear capacitors.

Accordingly, when binary digits represented by the oscillation phase are to be transmitted in one direction (for example, from the parametron $P_1$ to the parametron $P_2$ in FIG. 3A) by successively connecting several parametrons in a multiple-stage-cascade-connection through passave linear networks, transmission of an inverse coupling voltage is unavoidable, which results in an erroneous operation.

According to this invention, the above mentioned disadvantage is completely eliminated. The principle of this invention will be described in connection with the circuit of FIG. 4, in which the block N represents a coupling element having a variable coupling factor and consists of a four terminal network containing a nonlinear element. The four terminals are indicated by 3, **3*a*, 4 and 4*a***, respectively.

The transmission characteristic of the coupling element is controlled by a control signal supplied to control terminals *n*. Prevention of inverse coupling between the parametrons, $P_1$ and $P_2$ is obtained by making the coupling factor of the network N large in case the output oscillation of the parametron $P_1$ is being transmitted to the parametron $P_2$ and by making the factor zero in case of an inverse transmission of the output oscillation, namely from $P_2$ to $P_1$.

In FIGS. 5 and 6 is shown an example of the coupling circuit comprising saturable resonators and having a variable coupling factor. In FIG. 5, four magnetic cores, $F_1$, $F_2$, $F_3$ and $F_4$, are made of same material and have the same dimension. On these cores, are wound, respectively, primary coils $l_1$, $l_2$, $l_3$ and $l_4$, and secondary coils, $L_1$, $L_2$, $L_3$ and $L_4$.

Control coils $S_1$ and $S_2$ are, respectively, wound on two cores $F_1$ and $F_2$. The number of turns of the coils, $l_1$, $l_2$, $l_3$ and $l_4$, are equal, and the number of turns of the coils, $L_1$, $L_2$, $L_3$ and $L_4$, are equal, respectively.

The relations of winding polarities between the coils, $l_1$ and $L_1$, and between the coils, $l_2$ and $L_2$, are made inverse to those between the coils, $l_3$ and $L_3$, and between the coils $l_4$ and $L_4$. The coil $S_1$ is wound in the same direction as the coils $l_1$, $L_1$ and the coil $S_2$ is wound in reverse direction or polarity to the coils $l_2$ and $L_2$. Accordingly, when the coils, $S_1$ and $S_2$, are not supplied with any current from the terminals *n*, four magnetic cores are balanced and no coupling occurs between the terminals 3, **3*a* and 4, 4*a***. When the terminals *n* are supplied with an electric current, which may be alternating current or direct current, a difference occurs between the characteristics of the magnetic cores, $F_1$ and $F_2$, and the characteristics of the magnetic cores, $F_3$ and $F_4$, whereby the terminals 3, **3*a* and 4, 4*a*** are coupled. However, even when a current is supplied from the terminals *n* an electric voltage would not appear at the terminals 3 and 4. In this construction, when the number of turns of either coil $l_3$ or coil $L_3$ are doubled, the core $F_4$ may be omitted.

In FIG. 6, is shown an example of a nonlinear resistance type coupling circuit having a variable coupling factor. The circuit comprises blocking condensers C for blocking direct current, high frequency choke coils RFC and a rectifier D which may be of the vacuum tube type or of the semi-conductor type. When the circuit is supplied at teminals *n* with direct current, having a polarity so as to pass through the rectifier D, the terminals 3 and **3*a* are coupled with the terminals 4 and 4*a***, and when a current having an opposite polarity is applied to the terminals *n*, coupling between the terminals 3, **3*a* and 4, 4*a*** does not occur.

In FIG. 7A, is shown an example of this invention which is applied to a signal delay apparatus. In FIG. 7B are shown wave forms of the control currents to be supplied to the coupling elements. In the circuit of FIG. 7A, one group of the parametrons is excited by exciting currents *e*I and another group of the parametrons is excited by exciting current *e*II. The two kinds of excitations are carried out alternately and have two overlapping periods $t_1$ and $t_2$. The coupling factor of the coupling elements N is made zero by the application of control currents *n*I and *n*II which are produced synchronously with the above mentioned overlapping periods, whereby inverse coupling with its unfavorable effects to the operation of the circuit is entirely eliminated.

As described above, the principle of this invention is to disclose the use of elements for coupling parametrons and in which the transmission characteristic of the coupling element is varied in accordance with the interruption of the oscillation of the parametrons.

According to this invention, it is possible to control many parametrons by connecting parametrons in cascade in stages and dividing the output of one parametron, or to carry out "Not" coupling by insertion of a phase-inversion-circuit. According to the invention it is possible to use the output oscillation waves of an odd number of parametrons as input phase control signals for controlling the phase of the output of one parametron in order to carry out logical operation in accordance with the determination of the phase of the resultant input which is dependent upon the majority of the phases of the input signals.

By utilizing the above mentioned characteristics of parametrons, a digital computing device can be obtained as described in the U.S. Patent 2,948,818. For instance, when an electric counting circuit is to be manufactured, it is only necessary to apply this invention to the counter.

In this invention, it is not always necessary to excite alternately the adjacent parametrons as in case of FIGS. 7A and 7B. It is possible to excite each stage successively and to vary the transmission characteristic of the coupling elements synchronously with the exciting wave. However, it is possible to memorize one bit in only two parametrons by alternate excitation of said elements. According to this invention, electric computers or electric communication apparatus can be manufactured by using a smaller number of circuit elements than in the case where passive linear networks are used for coupling parametrons. Moreover, since the circuit is entirely prevented from causing inverse coupling, the characteristics and reliability of the circuit are remarkably improved.

While preferred embodiments of this invention have been shown and described, it will, of course, be understood that the invention is not limited thereto, since many modifications may be made and all such modifications are within the true spirit and scope of this invention.

What is claimed is:

1. In a binary computing arrangement, in combination, a cascade of parametron circuits connected in stages, each stage comprising one parametron, each parametron comprising a resonant output circuit responsive to an exciting current signal and a phase control signal having means connected in a balanced configuration for generating an output oscillation signal having a predetermined resonance frequency and one of two different phases with a phase displacement of 180 degrees from each other with said phases corresponding to conditions "0" and "1," said means in a balanced configuration of each resonant output circuit in each stage including nonlinear reactor means, means for applying to said nonlinear reactor means of each stage a respective one of two alternate periodic exciting current signals having a frequency of twice the resonance frequency and partially overlapping in time for exciting said stages successively in sequence thereby to generate the output resonant oscillation signal of the resonant circuit of said one parametron of each stage in sequence, means connected in each parametron for coupling said exciting current applying means to the resonant output circuit, means under control of two coupling control signals for selectively coupling the parametrons in cascade to apply the output resonant oscillation signal of the parametrons as at least one phase control input signal to the resonant output circuit of the next succeeding parametron only when said exciting currents overlap in time, means for selectively applying said coupling control signals to said coupling means synchronously with said exciting signals during the periods of overlap thereby to control coupling of the parametrons according to the sequence of oscillation whereby the direction of transmission of said phase control signals is determined.

2. In a binary computing arrangement according to claim 1, in which said coupling means comprises a plurality of coupling circuits, one each of said coupling circuits for coupling the respective resonant output circuits of respective parametrons with the next successive parametron, each of said coupling circuits having means determining a coupling factor variable between zero and a predetermined maximum under control of said coupling control signals.

3. In a binary computing arrangement according to claim 2, in which said means determining said coupling factor comprises a plurality of saturable core inductors, said windings developed on said cores connected to allow passage of said output oscillation signals through the coupling circuit during the presence of said coupling control signals.

4. In a binary computing arrangement, in combination, a cascade of parametron circuits connected in stages, each stage comprising one parametron, each parametron comprising a resonant output circuit responsive to an exciting current signal and a phase control signal having means connected in a balanced configuration for generating an output oscillation signal having a predetermined resonance frequency and one of two different phases with a phase displacement of 180 degrees from each other with said phases corresponding to condition "0" and "1," said means in a balanced configuration of each resonant output circuit in each stage including nonlinear reactor means, means for applying to said resonator of each stage a respective one of two alternate periodic exciting current signals having a frequency of twice the resonance frequency and partially overlapping in time for exciting said stages successively in sequence to generate the output resonant oscillation signal of the resonant circuit of said one parametron of each stage in sequence, means connected in each parametron for coupling said exciting current applying means to the resonant output circuit, means under control of at least one coupling control signal coupling the parametrons in cascade and for selectively applying the output resonant oscillation signal of the parametrons as at least one phase control input signal to the resonant circuit of the next succeeding parametron only when said exciting currents overlap in time, means for selectively applying said coupling control signal to said coupling means synchronously with said exciting signals during the periods of overlapping of said exciting signals thereby to control coupling of the parametrons according to the sequence of oscillation whereby the direction of transmission of said phase control signals is determined.

5. In a binary computing arrangement, in combination, a cascade of parametron circuits connected in stages, each stage comprising one parametron, each parametron comprising a resonant output circuit responsive to an exciting current signal and a phase control signal having means in a balanced configuration for generating an output oscillation signal having a predetermined resonance frequency and one of two different phases with a phase displacement of 180 degrees from each other with said phases responding to conditions "0" and "1," said means in a balanced configuration of each resonant output circuit including nonlinear reactor means, means for applying to said nonlinear reactor means of each stage one of two periodic exciting current signals having a frequency of twice the resonance frequency and partially overlapping in time for exciting said stages successively in a predetermined sequence to generate the output resonant oscillation signal of the resonant circuit of said one parametron of each stage in a sequence corresponding to said predetermined sequence, means connected in each parametron for coupling said exciting current applying means to the resonant output circuit, means for applying two input phase control signals of different phases to the resonant circuit of each stage for controlling the phase of the output oscillation signal of each stage in dependence of the resultant phase of all input signals to the resonant circuit, said phase control signals being representative of digits of binary members, means under control of two coupling control signals, for selectively coupling the resonant circuits of the parametrons in cascade thereby to apply the output resonant oscillation signal of the parametrons as a third phase control input signal to the resonant circuit of the next succeeding parametron only when said exciting currents overlap in time, means for selectively applying said coupling control signals to said coupling means synchronously with said exciting signals during the periods of overlap thereby to control coupling of the parametrons according to the sequence of oscillation whereby the direction of transmission of said third phase control signals is determined.

References Cited in the file of this patent

UNITED STATES PATENTS

| | | |
|---|---|---|
| 1,544,381 | Elmon et al. | June 30, 1925 |
| 1,884,845 | Peterson | Oct. 25, 1932 |
| 2,721,947 | Isborn | Oct. 25, 1955 |
| 2,723,354 | Isborn | Nov. 8, 1955 |
| 2,770,737 | Ramey | Nov. 13, 1956 |
| 2,815,488 | Von Neumann | Dec. 3, 1957 |